Feb. 12, 1952   R. H. SAGER   2,585,850
DEVICE FOR FACILITATING THE STARTING OF ENGINES
Filed Jan. 3, 1949

INVENTOR.
ROBERT H. SAGER
BY
William Soler
ATTORNEY

Patented Feb. 12, 1952

2,585,850

UNITED STATES PATENT OFFICE 2,585,850

DEVICE FOR FACILITATING THE STARTING OF ENGINES

Robert H. Sager, Willoughby, Ohio

Application January 3, 1949, Serial No. 68,939

7 Claims. (Cl. 123—179)

This invention relates, as indicated, to a device for facilitating the starting of engines and the like.

A primary object of the invention is to provide a device of the character described, embodying a pulley on which the starting cable, or cord, may be wound preliminary to starting the engine, without the necessity of rotating the engine flywheel during the winding operation.

Another object of the invention is to provide a device of the character described in which the pulley is automatically coupled with the engine flywheel after the starting cable or cord has been wound on the pulley.

A further object of the invention is to provide a device of the character described, in which the pulley may be disengaged from the flywheel manually, and with very little effort, but in which subsequent engagement of the pulley with the flywheel is effected in a simple and easy manner.

A still further object of the invention is to provide a device of the character described, which consists of parts which can be manufactured and assembled inexpensively, and in which any broken or worn parts can be quickly and easily replaced.

Other objects and advantages of the invention will be apparent during the course of the following description.

Figure 1:
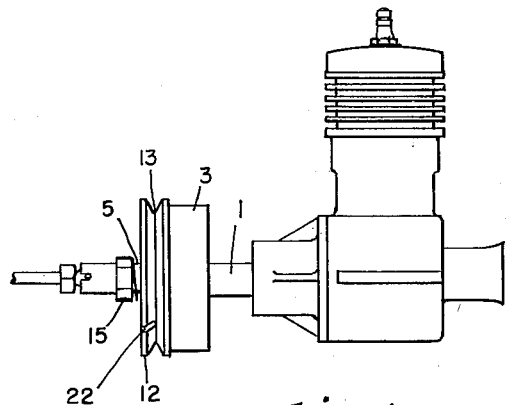
Figure 3:
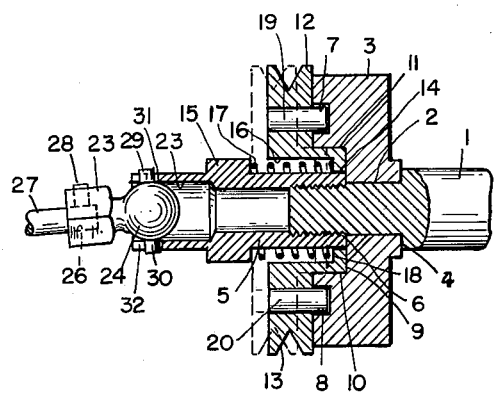
Figure 2:
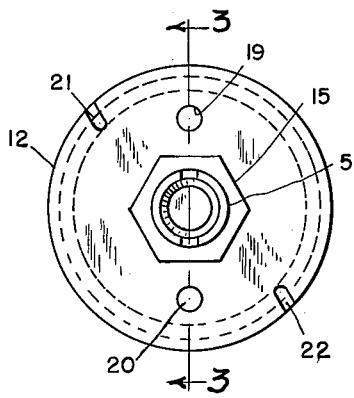

In the accompanying drawings, forming a part of this specification, and in which like numerals are employed to designate like parts throughout the same, Fig. 1 is a side elevational view of an engine, in combination with the device of the present invention;

Fig. 2 is an end elevational view of the device, as viewed from the left side of Fig. 1, and Fig. 3 is a fragmentary cross-sectional view, taken on the line 3—3 of Fig. 2.

Referring more particularly to the drawings, reference numeral 1 designates the shaft of an internal combustion engine, said shaft having a portion 2 of reduced diameter, on which a flywheel 3 is press-fitted or otherwise rigidly secured. The flywheel 3 is secured against a shoulder 4 on the shaft by means of a sleeve 5 which is threadedly secured to the end 6 of the shaft and bears at one end against the hub portion of the flywheel.

The flywheel 3 is provided in one face thereof with recesses 7 and 8, spaced 180 degrees apart, and the central opening 9 of the flywheel is counterbored as at 10 for the reception of the hub-like extension 11 of a pulley 12. The pulley 12 has a recess 13 in the periphery thereof, of V-shaped cross-section, and the extension 11 has a central opening 14, through which the end of the sleeve 5 extends. The sleeve 5 has an enlarged central portion 15 of polygonal external cross-section, and the opening 10 of the flywheel is counterboard, as at 16, for the reception of a compression coil spring 17, which surrounds the sleeve 5 and bears at one end against the shoulder 18 formed at the junction of the opening 10 and counterbore 16, and at the other end against the portion 15 of the sleeve.

The pulley 12 is also provided with a pair of pins 19 and 20, which are press-fitted or otherwise rigidly secured in the pulley and have portions projecting beyond one face of the pulley and adapted to enter the recesses 7 and 8 respectively, of the flywheel. Slots or notches 21 and 22 are provided in the pulley, at diametrically opposite points of the periphery of the pulley, these slots or notches being adapted for securing therein one end of the starting cord or cable which is conventionally used to start the engine.

The sleeve 5 is also provided with an enlarged recess 23 adapted to receive the ball 24 of a universal joint or coupling 25 having a recess 26 in which one end of a propeler shaft 27, or the like, is secured, as by a set screw 28. The ball 24 is provided with pins 29 and 30 at diametrically opposite points thereof which extend into slots 31 and 32 respectively, in the end of the sleeve 5. Although the shaft 27 has been designated as a propeller shaft, it will be understood that this may be the shaft or driving element of a boat, vehicle, or other device which is to be driven by the internal combustion engine.

The operation of the device may be briefly described as follows:

The pulley 12 is normally urged to the position shown in solid lines, by the spring 17, and in this position, the pins 19 and 20 are disposed in the recesses 7 and 8 respectively, so that the pulley and flywheel are rotatable as a unit for the purpose of starting the engine.

When it is desired to start the engine, the pulley 12 is manually pushed along the sleeve 5, to the position shown in dotted lines, in which position the pins 19 and 20 are clear of engagement with the flywheel. This compresses the spring 17. One end of the starting cord or cable is then inserted in one of the slots or notches 21 or 22, and the pulley is then rotated by hand to wind the cable thereon. After the cable is thus wound on the pulley, the pulley is released, permitting the pins 19 and 20 to reenter the recesses 7 and 8. If the pins 19 and 20 are not aligned with the recesses 7 and 8 at the time of release, a slight turn of the pulley will effect such alignment, the pins automatically entering the recesses, due to the action of the spring 17.

The starting of the engine is then effected in the customary manner by pulling the free end of the cable to unwind it from the pulley, the secured end of the cable slipping from the notch 21 or 22 at the end of this starting operation.

Since the cable is wound on the pulley while the pulley is disengaged from the flywheel, the winding is effected without difficulty, and without the necessity of turning the flywheel against the compression of the engine during this operation, as in conventional starting practice. Starting of the engine thus becomes a positive, easy, operation, as contrasted with the difficulty and uncertainty encountered in conventional starting practice.

Although the flywheel is shown, in this case, as mounted on a reduced portion of the shaft, it will be understood that the flywheel may be mounted on a shaft of unvarying diameter.

It will be noted that the device consists of a minimum number of parts which can be manufactured and assembled inexpensively, and in which any broken or worn parts can be quickly and easily replaced.

Although the device has been designed primarily for facilitating the starting of small or miniature engines for model boats, etc., it will be understood that the principles of the invention are applicable to the starting of engines generally, particularly motor boats and other water craft.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a device of the character described, an engine drive shaft, a flywheel rotatable with said shaft, a pulley rotatable relatively to said shaft, means for interlocking said pulley and flywheel to permit rotation thereof as a unit, and spring means bearing against said pulley to cause said interlocking.

2. In a device of the character described, an engine drive shaft, a flywheel rotatable with said shaft, an element secured to said shaft in axial alignment therewith, a pulley rotatable relatively to said element, said flywheel and pulley having interengaging means for permitting rotation of the flywheel and pulley as a unit, said pulley being movable out of interengagement with the flywheel, whereby to permit said pulley to be rotated independently of said flywheel.

3. A device, as defined in claim 4, in which a compression coil spring is interposed between said element and said pulley for normally urging said pulley into interengagement with the flywheel.

4. A device, as defined in claim 5, in which said pulley is movable manually out of engagement with said flywheel against the action of said spring.

5. A device, as defined in claim 6, in which said interengaging means comprises recesses in an end face of said flywheel and pins projecting from the pulley and adapted to enter said recesses.

6. In a device of the character described, an engine drive shaft, a flywheel rotatable with said shaft, an element secured to said shaft, a pulley rotatable about said element, means for interlocking said pulley and flywheel to permit rotation thereof as a unit, and spring means interposed between said element and pulley for urging said pulley and flywheel into interlocked engagement.

7. A device, as defined in claim 2, in which said pulley is movable manually out of interlocked engagement with said flywheel against the pressure of said spring means.

ROBERT H. SAGER.

REFERENCES CITED

The following references are of record in the file of this patent:

UNITED STATES PATENTS

| Number | Name | Date |
| --- | --- | --- |
| 1,434,309 | Nelson | Oct. 31, 1922 |
| 2,306,231 | Smith | Dec. 22, 1942 |
| 2,385,963 | Beard | Oct. 2, 1945 |

FOREIGN PATENTS

| Number | Country | Date |
| --- | --- | --- |
| 28,134 | France | Oct. 7, 1924 |